United States Patent [19]

Slobodyanik

[11] 4,036,917
[45] July 19, 1977

[54] CONTACT PLATE FOR COLUMNS FOR CARRYING OUT MASS TRANSFER PROCESSES BETWEEN GAS AND LIQUID

[76] Inventor: Ivan Petrovich Slobodyanik, ulitsa Gagarina, 87, kv. 15, Krasnodar, U.S.S.R.

[21] Appl. No.: 637,828

[22] Filed: Dec. 4, 1975

[51] Int. Cl.² .................... B01D 3/22; B01D 3/26
[52] U.S. Cl. .................... 261/114 JP; 261/114 R
[58] Field of Search .................... 261/114 R, 114 JP

[56] References Cited

U.S. PATENT DOCUMENTS 3,338,566   8/1967   Kittel .................... 261/114 JP

FOREIGN PATENT DOCUMENTS 91,675    8/1959   Netherlands .................... 261/114 JP
344,041   3/1960   Switzerland .................... 261/114 R
25,299   11/1909   United Kingdom .................... 261/114 R
682,721  11/1952   United Kingdom .................... 261/114 JP

*Primary Examiner*—Tim R. Miles
*Assistant Examiner*—Gregory N. Clements

[57] ABSTRACT

A contact plate for columns for carrying out heat exchange and mass transfer processes comprising a disc provided with slots for the passage of gas. The slot edges have curved deflectors which send gas jets passing through the slots in one direction, tangentially to the disc, and at a certain angle to the latter's surface. On the side of the disc which is intended for the reception of liquid there are arranged deflector strips in the form of Archimedean spirals diverging from the center of the disc and bent in the direction of gas jets following their contact with the curved deflectors.

5 Claims, 4 Drawing Figures

CONTACT PLATE FOR COLUMNS FOR CARRYING OUT MASS TRANSFER PROCESSES BETWEEN GAS AND LIQUID

The present invention relates to equipment for carrying out heat exchange and mass transfer process between a gas and a liquid and, more specifically, to contact plates employed in vertical rectifying, absorption, washing and contact columns, wherein liquid moves from top to bottom and comes into contact with gas which is directed upwards.

The proposed contact plate is most advantageous in mass transfer columns for separating thermally unstable, polymerous mixture, or mixtures wherein undesirable chemical reactions are liable to occur. In other words, the plate of the present invention is at its best in situations when a liquid is expected to stay in an apparatus for a strictly limited period of time.

Known in the art is a contact plate for columns for carrying out heat exchange and mass transfer processes between a gas and a liquid, which comprises a disc with slots for the passage of gas. The slot edges are provided with arched or curved deflectors arranged so as to send gas jets passing through the slots in one direction, tangentially to the disc and at a certain angle to the latter's surface. This type of plate is simple in design and requires a limited amount of metal in its production. Also, this plate is marked by its low hydraulic resistance. In a column, such plates are arranged one above another. From an upper plate, liquid is received in a central bowl of the lower plate and is caught by tangential jets of gas directed to the top of the column and passing through the slots in the plate. As a result of its interaction with the gas, the liquid moves radially and in circles from the center of plate to its periphery and is directed into an annular pocket provided at the peripheral portion of the plate. From said pocket, the liquid proceeds to the lower plate, etc.

The contact plate under review withstands great loads and ensures a good contact between the phases, as well as intensified heat exchange and mass transfer between the phases.

Nevertheless, the known type of contact plate can only ensure effective and stable operation of a column within a limited range of gas and liquid loads. Such plates do not provide for uniform distribution of gas and liquid flows over the cross-section of the plate. This leads to wave formation in the rotational liquid flow and, as a result to a substantial reduction in the mass transfer rate. These disadvantages are increasingly manifest with an increase in the column's diameter.

Because of the foregoing disadvantages, the plate under review has not found extensive application in industry.

It is an object of the present invention to provide a contact plate for a column for carrying out heat exchange and mass transfer processes between a gas and a liquid, which ensures effective and stable operation of the column within a wide range of gas and liquid loads.

It is another object of the invention to provide a contact plate which raises the effectiveness of the column by excluding wave formation in the rotational liquid flow on the plate's surface.

It is still another object of the invention to provide a contact plate which raises the effectiveness of heat exchange and mass transfer with an increased diameter of the column.

The foregoing objects are attained in a contact plate for a column for carrying out heat exchange and mass transfer processes between a gas and a liquid, which comprises a disc with slots for the passage of gas, the slot edges being provided with curved or arched deflectors arranged so as to send jets of gas passing through the slots in one direction, tangentially to the disc and at a certain angle to the disc's surface, there being arranged, in accordance with the invention, deflector strips on the side of the disc intended for the reception of liquid, which deflector strips are shaped as Archimedean spirals diverging from the center off the disc and bent in the direction of gas jets after their contact with the arched deflectors.

In the contact plate of the present invention, the deflector strips account for additional turbulence of the gas and liquid, dispersion of the liquid, as well as an increase in and multiple renewal of the interphase surface, which intensifies the heat exchange and mass transfer between the phases and raises the effectiveness of these processes. In addition, the deflector strips eliminate wave formation in the rotational flow of liquid.

The fact that the deflector strips are shaped as Archimedean spirals accounts for constant width of the rotational flow front between adjacent deflector strips, which makes for a uniform distribution of gas and liquid flows over the cross-section of the contact plate and raises the effectiveness of the process.

By varying the parameters of the Archimedean spirals and the height of the deflector strips, it is possible to predetermine the effectiveness of the heat exchange and mass transfer between phases in accordance with the ratio between gas and liquid loads. For example, with extremely low liquid loads and at high gas speeds (such conditions are observed in vacuum rectification processes), deflector strips in the form of Archimedean spirals with certain parameters account for a 30- to 50-percent increase in the mass transfer effectiveness of the contact plate (the Murphree efficiency factor), as compared to the performance of a plate without deflector strips. Additionally, with extremely high unit loads as regards liquid and at low gas speeds (under the conditions of extractive rectification), when the kinetic energy of the gas is insufficient to whirl the liquid, deflector strips in the form of Archimedean spirals with certain parameters additionally whirl the liquid in the horizontal plane. This is conductive to uniform liquid distribution over the contact plate's section and raises the effectiveness of the heat exchange and mass transfer between gas and liquid.

Other objects and advantages of the present invention will become more apparent from the following detailed description of a preferred embodiment thereof taken in conjunction with the accompanying drawings, wherein.

Referring now to the attached drawings, the proposed contact plate for columns for carrying out heat exchange and mass transfer processes between a gas and a liquid comprises a disc 1 (FIGS. 1 and 2) with slots for the passage of the gas. The slot edges are provided with curved or arched deflectors 2 (FIGS. 1, 2, 3 and 4). The arched deflectors 2 are arranged so as to send jets of gas passing through the slots in one direction, tangentially to the disc 1 (FIG. 1) and at a certain angle to the disc's surface. For greater convenience of manufacturing such plates with the use of stamping techniques, it is advisable that the slots with the arched deflectors 2 be arranged on the disc 1 in concentric circles.

The slots may be arranged differently, for example, in chessboard order, but it is essential that jets of gas passing through the slots should be directed tangentially to the disc 1 and at a certain angle to its surface.

Irrespective of the arrangement of the slots with the arched deflectors 2 on the disc 1, said slots must be spaced equidistantly both along the radius and circumference of the disc 1 in order to ensure uniform distribution of gas over the section of the contact plate, as well as symmetrical flows of gas and liquid on the disc 1.

Figure 1:
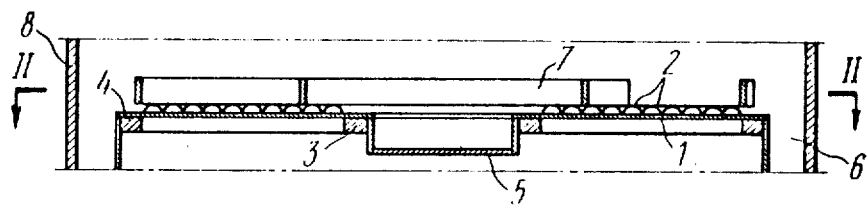
FIG. 1 is an elevation view of a contact plate according to the invention, installed in a column.

The disc 1 is attached to supporting rings 3 and 4 (FIG. 1). In the center of the contact plate there is a central receiving bowl 5 which receives liquid from the upper contact plate. Arranged at the peripheral portion of the contact plate is an annular decantation pocket 6, to which liquid is directed from the contact plate and wherefrom it proceeds to the center of the lower contact plate.

Figure 2:
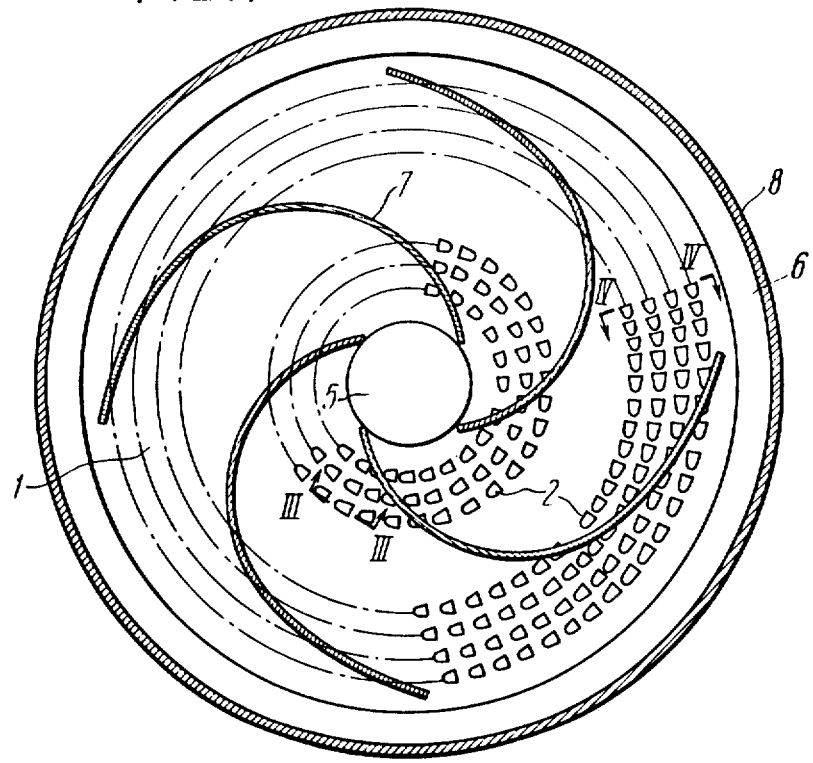
FIG. 2 is a sectional view taken along the line II—II in FIG. 1.
Figure 3:
FIG. 3 is a magnified sectional view taken along line III—III in FIG. 2.
Figure 4:
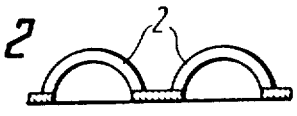
FIG. 4 is a magnified sectional view taken along line IV—IV in FIG. 2.

On the side of the disc 1 which is intended to receive liquid, there are arranged deflector strips 7 (FIGS. 1 and 2) shaped as Archimedean spirals diverging from the center of the disc and bent in the direction of the gas jets following the latters' contact with the arched deflectors 2 (FIG. 2) and, consequently, in the direction of the rotational flow on the contact plate. As seen in FIG. 2 the deflector strips 7 extend over at least the major portion of the radial extent of the slots.

The contact plate is installed in a column 8 (FIG. 1). Attached to the walls of said column 8 is the annular decantation pocket 6 and supporting bars (not shown) to secure the disc 1 and the supporting 3 and 4. On the receiving side of the disc 1, there may be arranged one or several deflector strips 7 shaped as Archimedean spirals. In case there is a number of said deflector strips, these must be arranged symmetrically in order to ensure uniform distribution of the liquid flow directed from the center of the disc 1 toward its periphery.

The width of the liquid flow front for each section between adjacent deflector strips 7 will, in this case, be uniform and constant over the entire distance between the center of the disc 1 and its periphery. This is due to the fact that said deflector strips 7 are shaped as Archimedean sprials. This important feature of Archimedean spirals is used to ensure uniform distribution of gas and liquid flows over the contact plate.

The proposed contact plate, installed in the column 8 for carrying out heat exchange and mass transfer processes between gas and liquid, operates as follows.

Gas (or vapor), which is supplied to the column from the bottom, passes through the slots with the arched deflectors 2, whereby there is produced a continuously rotating gas (vapor) flow catching liquid which is supplied from above to the central receiving bowl 5 and proceeds therefrom to the contact plate. Thus, a continuously rotating two-phase flow is produced. As this takes place, the liquid on the disc 1 is in radial gyrating motion in the horizontal plane and is directed from the center of the disc 1 toward its periphery where it is caught in the annular decantation pocket 6. At the same time, the gas (or vapor) is in helical motion and is directed upwardly to the underside of the next upper plate, etc. The rotating two-phase flow is reflected from the reflector strips 7 in the shape of Archimedean spirals, whereby the gas (vapor) and liquid flows are rendered additionally turbulent, the liquid is dispersed, and the interphase surface is expanded and renewed a multiplicity of times. The result is an intensified heat exchange and mass transfer between the phases and an increased mass transfer rate of the contact plate (the Murphee efficiency factor). Due to the fact that the direction of the curvature of the deflector strips 7 shaped as Archimedean spirals coincides with the direction of the regularly rotating two-phase flow, the liquid keeps moving without any longitudinal mixing. This is conducive to an increase in concentration gradients in the liquid phase and the movite force of the mass transfer process, which, in turn, raises the mass transfer efficiency of the contact plate. A constant front width of the liquid flow between adjacent deflector strips 7 and over the distance between the center of the disc 1 and its periphery makes for uniform transverse distribution of the divergent liquid flow over the section of the contact plate and, as a result, uniform distribution of the gas (vapor) flow over the section of the contact plate. The latter factor alo raises the mass transfer efficiency of the contact plate.

By increasing the number of deflector strips 7 arranged on the disc 1 and by appropriately selecting the parameters of the Archimedean spirals depending upon the specific gas (vapor) and liquid flow rates, it is possible to attain an optimum efficiency of the contact plate. It should be taken into consideration that a great number of deflector strips 7 leads to an increase in the quantity of metal required to manufacture the contact plate and reduces the latter's free section, whereby the hydraulic resistance of the plate is raised. Nevertheless, it should be remembered that deflector strips 7 eliminate wave formation of the rotational liquid flow on the contact plate, which is particularly typical of large-diameter contact plates. This is also conducive to uniform distribution of the phase flows on the contact plate and raises the mass transfer efficiency of the contact plate (the Murphee efficiency factor).

For a regularly gyrating two-phase flow directed from the center of the contact plate toward its periphery, the liquid decantation perimeter is much greater than that for contact plates with a transverse movement of liquid. In the former case there is no excessive decantation; there is ensured uniform distribution of gas (vapor) and liquid over the section of the contact plate, and longitudinal mixing of liquid is eliminated. All these factors account for increased concentration gradients, additional turbulence of the phases, dispersion of liquid, and an increase in and multipal renewal of the interphase surface and, in the final analysis, lead to a greater mass transfer efficiency of contact plates (the Murphree efficiency factor).

It is very important that with an increase in the diameter of columns, the actual efficiency of the contact plates (the Murphree efficiency factor) increases, too, whereby plates of the present invention are recommended for columns of great unit capacity.

The contact plate of the present invention is highly effective with small liquid unit loads and at great speeds of gas flow (under the conditions of vacuum rectification) due to the use of deflector strips 7 shaped as Archimedean spirals with preselected parameters, which under such hydrodynamic conditions increase the volume of liquid on the contact plate and, consequently, prolong the average period of contact between the liquid and gas. The proposed contact plate is equally effective with great liquid unit loads and small gas loads (under the conditions of extractive rectification). The latter is also due to the use of deflector strips 77 in the shape of Archimedean spirals with preselected parameters, which under these hydrodynamic conditions help to whirl the regularly gyrating flow of liquid which is divergent from the center of the disc to its periphery, because in these conditions the kinetic energy of the gas jets passing through the slots with the arched deflectors 2 is insufficient to intensively whirl the liquid.

What is claimed is:

1. A contact plate for columns for carrying out heat exchange and mass transfer processes between a gas and a liquid, comprising: a disc with slots for the passage of gas; arched deflectors at the edges of said slots, arranged so as to send jets of gas passing through the slots in one direction, tangentially to said disc and at a certain angle to its surface; deflector strips attached to the side of said disc which is intended to receive liquid, said deflector strips being shaped as Archimedean spirals diverging from the center of said disc and bent in the direction of gas jets following their contact with said arched deflectors and extending over at least the major portion of the radial extent of the slots.

2. A plate as claimed in claim 1 wherein said deflectors and said strips are on the same side of said plate.

3. A plate as claimed in claim 2 wherein said strips are on said deflectors.

4. A plate as claimed in claim 3 wherein said strips are equally spaced.

5. A plate as claimed in claim 3 wherein said strips extend radially over the entire radial extend of the slots.

* * * * *